United States Patent [19]
Carr et al.

[11] Patent Number: 5,187,399
[45] Date of Patent: Feb. 16, 1993

[54] LEVITATED MICROMOTOR

[75] Inventors: William N. Carr, Wayne, N.J.; Hong Yu, San Jose, Calif.; Dong-Il D. Cho, Princeton Junction, N.J.

[73] Assignee: The Trustees of Princeton University, Princeton Junction, N.J.

[21] Appl. No.: 810,386

[22] Filed: Dec. 19, 1991

[51] Int. Cl.$^5$ ............................ H02K 7/00; H02N 1/00
[52] U.S. Cl. ................................ 310/40 MM; 310/309
[58] Field of Search .................... 310/40 MM, 309, 90, 310/268

[56] References Cited

U.S. PATENT DOCUMENTS

| | | | |
|---|---|---|---|
| 4,736,127 | 4/1988 | Jacobsen | 31/308 |
| 4,943,750 | 7/1990 | Howe et al. | 310/309 |
| 5,015,906 | 5/1991 | Cho et al. | 310/309 |

OTHER PUBLICATIONS

"Electric Levitation Bearings for Micromotors", Suresh Kumar and Dan Cho, Digest of Technical Papers, IEEE International Conference on Solid State Sensors and Actuators, pp. 882–885, 1991.

"A Proposal for Electrically Levitating Micromotors", S. Kumar and Cho, Sensors and Actuators, vol. 24, 1990, pp. 141–149.

*Primary Examiner*—Steven L. Stephan
*Assistant Examiner*—Matthew Nguyen
*Attorney, Agent, or Firm*—Perman & Green

[57] ABSTRACT

An electrostatically levitated micromotor is described that includes a generally planar rotor that exhibits an axis of symmetry and includes electrically conductive portions. A balanced stator arrangement is positioned adjacent the rotor and is connected to multi-phase circuitry for enabling the rotation of the rotor about its symmetry. A plurality of levitating electrodes are positioned about the rotor and circuitry is connected thereto for forming resonant circuits that include the conductive portion of the rotor and exhibit a natural resonant frequency. A power source energizes the resonant circuits at a frequency greater than the natural frequency and thereby enables stable levitation of the rotor.

9 Claims, 3 Drawing Sheets

LEVITATED MICROMOTOR

This invention relates to micromotors and, more particularly, to a micromotor that employs both balanced stator and levitating structures t achieve improved motor operation and torque characteristics.

BACKGROUND OF THE INVENTION

Silicon micromachining has been developed over the last decade as a means for accurately fabricating small structures. Such processing generally involves the selective etching of a silicon substrate and depositions of thin film layers of semiconductor materials. Silicon micromachining has been applied to the fabrication of micromachines that include a rotary or linear bearing that allows substantially unrestricted motion of a moving component in one degree of freedom. Such bearings have spawned the development of electrically-driven motors referred to herein as micromotors. Such micromotors have a planar geometry, gap separations on the order of 1–2 microns and lateral dimensions on the order of 100 microns or more.

Although such micromachines have been successfully fabricated and tested, many have not proved entirely satisfactory for the reason that difficulty has been experienced in constructed bearing arrangements. In short, such bearings have exhibited excessive friction and wear due to mechanical contact between stationary and moving parts.

In co-pending U.S. patent Application Ser. No. 07/810395, and assigned to the same Assignee as this application, the problem of bearing friction has been substantially alleviated by the provision of balanced torque stators, vertically disposed (and opposed) about a disk-like rotor that is tethered by a central bearing. The application of balanced, multi-phase signals to the opposed torque stators allows balanced electrostatic forces to be imposed upon the tethered rotor, which forces also act to impart rotative motion to the rotor.

In a parallel development to that described in the above-noted patent application, two of the inventors hereof also developed a levitation method that eliminates most mechanical contact between moving elements of a micromachine while, at the same time, enabling desired motion actions and/or forces. This invention is described in Cho et al. U.S. Pat. No. 5,015,906, issued May 14, 1991. The teachings of the Cho et al. patent are incorporated herein by reference. To provide a background for the invention to be described herein, a brief resume of the teachings found in the '906 patent will be presented. FIG. 1 hereof is a reproduction of FIG. 3 from that patent and achieves three-dimensional levitational stability of a freely movable planar structure 10. The embodiment of FIG. 1 includes a non-conductive substrate 12 from which two vertical walls 14 and 16 extend and support horizontal walls 18 and 20. Together, the walls form a cavity 22 with a narrow slit 24. Mounted on the under surface of walls 18 and 20 are conductive plates 26 and 28 are respectively. Similar conductive plates 26' and 28' are mounted on the upper surfaces of substrate 12, inside cavity 22 and directly below the upper disposed plates 26 and 28, respectively.

Planar structure 10 is emplaced in cavity 22 and includes a thin, non-conductive plate 30 sandwiched between conductive plates 32 and 34. A high frequency voltage source 36 is connected, on one side, to opposed plates 28 and 28' and on the other side, via inductors 38, to opposed conductive plates 26 and 26'. Planar structure 10 will levitate in stable equilibrium for all spatial orientations of the structure shown in FIG. 1 and substantially independent of gravity.

As is described in the '906 patent, the structure shown in FIG. 1 can be represented by an equivalent circuit including voltage source 36, inductors 38, the capacitance between plates 26, 26' and 28, 28', conductors 32 and 34, and the distributed resistance of the circuit. The equivalent circuit includes two parallel and opposed resonant circuits which, when properly energized, will cause the stable levitation of planar structure 10.

In operation, planar structure 10 is held in vertical equilibrium with a constant gap distance "d". Planar structure 10 is held in a stable position if the frequency of voltage source 36 has a frequency $f_s$ that is greater than the natural frequency $f_n$ of the parallel resonant circuits. The stability of levitation of structure 10 comes about as a result of the fact that the net forces acting on structure 10, when it is displaced from its equilibrium position, is restoring, i.e., an upward displacement of structure 10 produces a net downward force and vice versa.

A restoring force is achieved by having the frequency $f_s$ of voltage source 36 greater than the natural frequency of the afore-described resonant circuit. Thus, when structure 10 is perturbed from its equilibrium position, the capacitance values change which, in turn, change the voltages applied across the respective capacitances. As a result, the value of the electric force field is altered within cavity 22. The frequency $f_s$ is such that the rate of increase (or decrease) in the oscillating electric force field is greater than the rate of decrease (or increase) in the gap distance "d". Therefore, structure 10 experiences a net vertical restoring force that is essentially a null at some levitation position located between the upper and lower levitating plates respectively.

A horizontal, stable equilibrium is also imparted to structure 10 when it is centrally positioned in cavity 22. From this central position, a horizontal displacement of structure 10 (e.g., to the right or the left), will produce a net horizontal restoring force on structure 10 in the direction opposite to the direction of displacement. For instance, if structure 10 is moved slightly to the right from the position shown in FIG. 1, the attractive forces produced by plates 26, 26' and 28, 28' will have a net horizontal component to the left and pull structure 10 back to the center. The horizontal component of the attractive force on structure 10 is essentially zero when it is symmetrically disposed between plates 26 26' and 28, 28'.

FIG. 2 is a reproduction of FIG. 6b of the '906 patent. It shows the application of the levitational principles described above to a rotating embodiment. In FIG. 2, a disk-shaped levitating rotor 50 has a serrated edge and a plurality of radial conductive members 52 disposed on its surface. A drum shaped housing 54 (shown only in plan view) has a plurality of radially disposed electrodes 56 positioned over rotor 50. Groups of three of radial electrodes 56 are connected in a three phase relationship to a voltage source/inductor arrangement identical to that described for FIG. 1. Each of the voltage sources, in accordance with the above-described principle have frequencies of oscillation greater than the natural frequencies of the resonant circuits connected thereto. The circuits enable the levitation of rotor 50 through the attractive forces induced between conductive strips 52 and 54. Conductive strips 52 are arranged radially about rotor 50 and have an asymmetrical spacing with respect to electrodes 56. Thus, when the voltage sources are sequentially energized, radial forces are induced in rotor 50, thereby enabling its rotation.

Further details concerning the above-described invention can be found in "A Proposal for Electrically Levitating Micromotors", Kumar et al., Sensors and Actuators, Vol. 24, 1990, pages 141-149 and "Electric Levitation Bearings For Micromotors", Kumar et al., Digest of Technical Papers, IEEE International Conference on Solid State Sensors and Actuators, pp. 882-885, 1991.

As is shown by the above described prior art, it is possible, using an RF circuit, to levitate a conducting rotor in a micromotor design. The levitation forces can be applied in three dimensions to suspend the rotor against the force of gravity and permit a design that does not include a friction bearing. However, the switching technique employed to impart rotational movement to the levitating structure shown in the '906 patent, while satisfactory, presents circuit design complications that are somewhat expensive to implement.

Accordingly, it is an object of this invention to provide an improved vertical-drive, levitated micromotor.

It is another object of this invention to provide an improved vertical-drive, levitated micromotor that exhibits simplified circuit requirements.

It is still another object of this invention to provide a levitated micromotor arrangement that provides improved balance and levitation characteristics for a non-tethered rotor.

SUMMARY OF THE INVENTION

An electrostatically levitated micromotor is described that includes a generally planar rotor that exhibits an axis of symmetry and includes electrically conductive portions. A balanced stator arrangement is positioned adjacent the rotor and is connected to multiphase circuitry for enabling the rotation of the rotor about its axis of symmetry. A plurality of levitating electrodes are positioned about the rotor and circuitry is connected thereto for forming resonant circuits that include the conductive portions of the rotor and exhibit a natural resonant frequency. A power source energizes the resonant circuits at a frequency greater than the natural frequency and thereby enables stable levitation of the rotor.

DETAILED DESCRIPTION OF THE INVENTION

Figure 1:
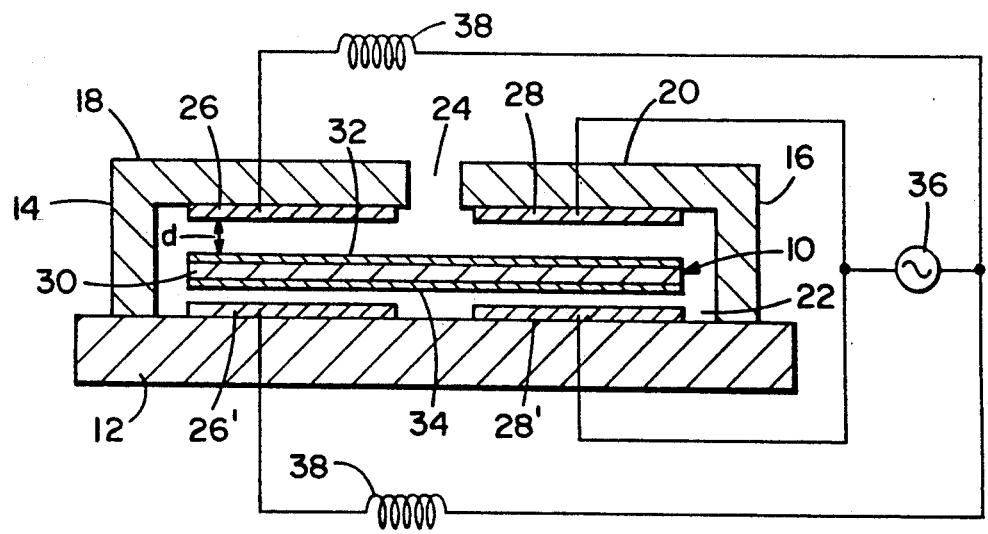
FIG. 1 is a side sectional view of a prior art levitated structure.
Figure 2:
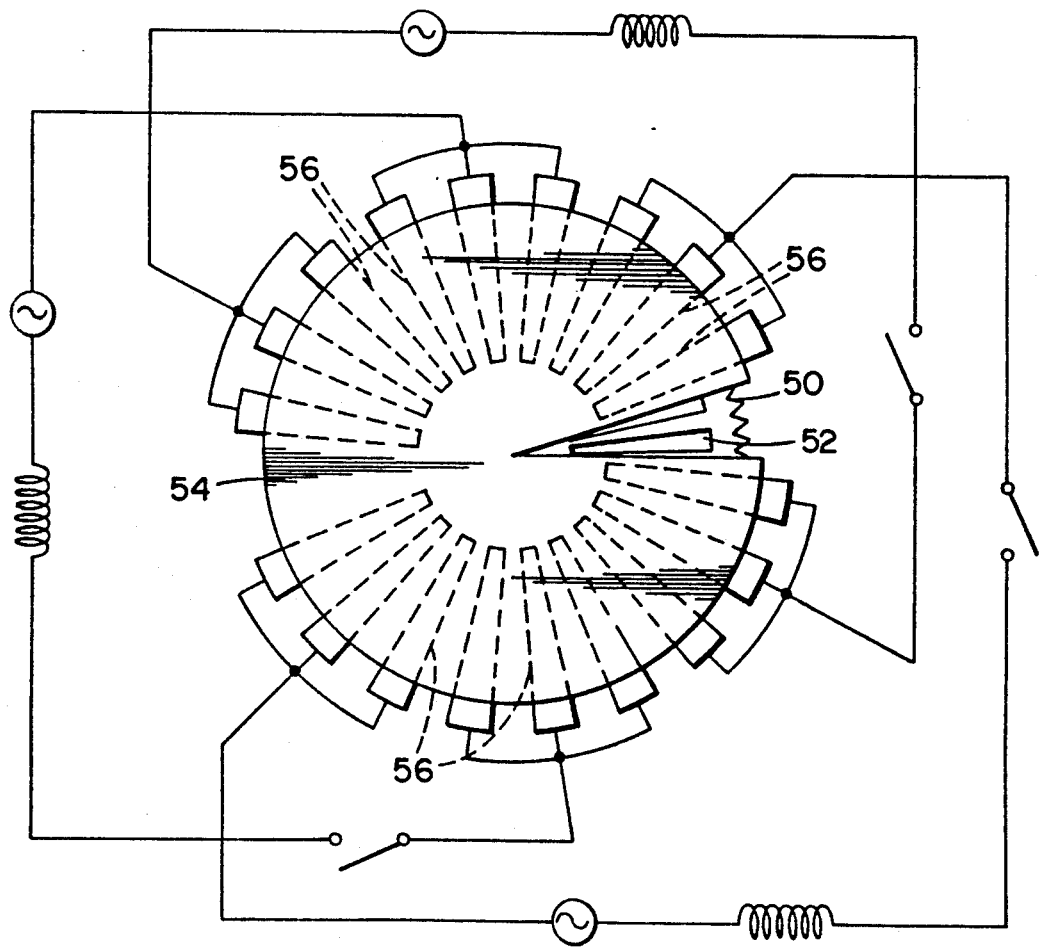
FIG. 2 illustrates a prior art micromotor that incorporates the levitating action employed in FIG. 1.
Figure 3:
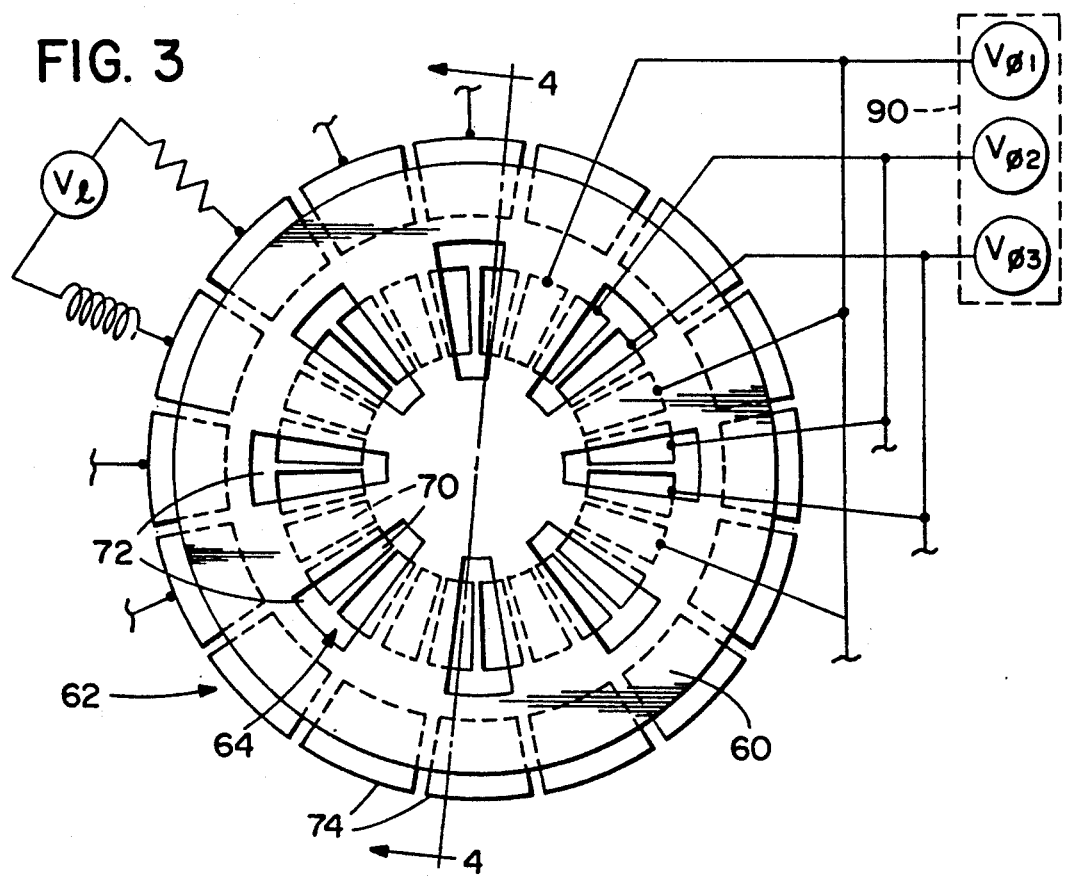
FIG. 3 is a schematic plan view of a micromotor incorporating the invention and showing a rotor, an underlying torque stator and an underlying levitating stator.

In FIG. 3, a plan, schematic view is shown of a micromotor including rotor 60, underlying annular levitation stator 62 and underlying annular torque stator 64. The sectional view shown in FIG. 4 (taken along line 4—4 in FIG. 3) shows an upper levitation stator 66 and an upper torque stator 68, both of which have been removed from the view of FIG. 3 to enable visualization of rotor 60 and its underlying stators. Lower and upper torque stators 64 and 68 are each provided with a plurality of conductive electrodes 70 arranged in an annulus about axis of symmetry 72. Electrodes 70 sandwich rotor 60 therebetween and are vertically aligned.

Rotor 60 is preferably comprised of a conductive material, i.e. polysilicon. Rotor 60 may also be comprised of a non-conductive planar inner member with conductive layers adhered to its external surfaces. A plurality of apertures 72 are aligned in an annulus about rotor 60 and are positioned so as to lie between conductive electrodes 70. Apertures 72 create non-conductive regions in rotor 60 which enhance and induce tangential forces therein that enable motor action to occur. Levitation stators 62 and 66 each comprise a plurality of vertically aligned electrodes 74, arranged in an annulus about axis of symmetry 71.

Figure 4:
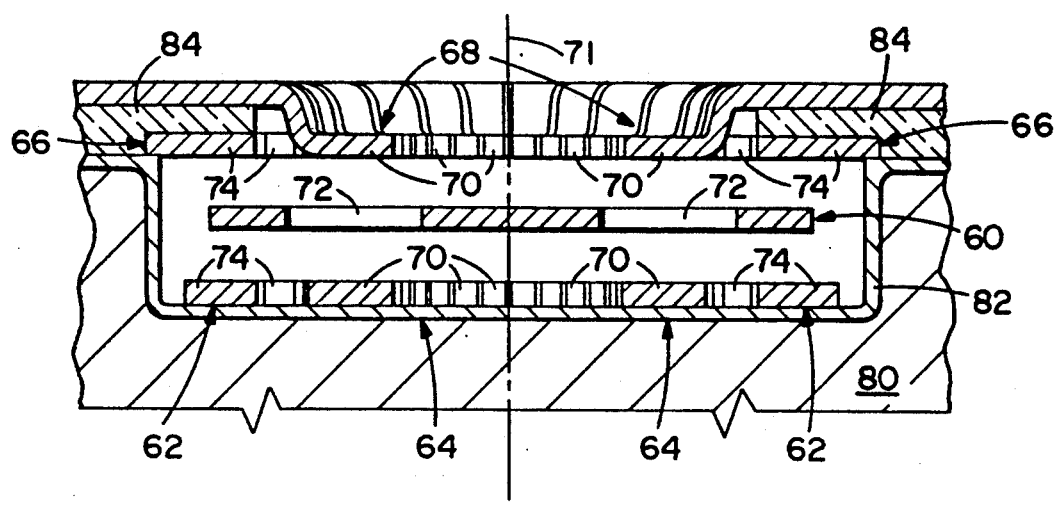
FIG. 4 is a sectional view of the micromotor of FIG. 3 showing the rotor, both upper and lower torque stators and upper and lower levitating stators.

The motor configuration shown in FIGS. 3 and 4 is shown having been constructed from a semiconductive substrate 80. An insulating layer 82 supports electrodes 70 of torque stator 64 and electrodes 74 of levitating stator 62. Layer 82 also provides electrical isolation between these electrodes and substrate 80. Upper levitating stator 66 (and its electrodes 74) are supported in a cantilever fashion from insulating layer 82 and are covered by a further insulating layer 84. Upper torque stator 68 extends over insulating layer 84 and cantilevers electrodes 70 over rotor 60.

Electrical interconnections are shown schematically in FIG. 3, but are excluded from FIG. 4 to prevent over-complication of the view. A three-phase supply 90 is connected to lower and upper torque stators 64 and 68 as shown in FIG. 3. Each phase is connected, in the standard manner, to every third electrode 70 so as to create a rotating phase energization of torque stator electrodes 70. The application of three-phase energization signals create charge distributions on the stator electrode surfaces. Those charge patterns create fringing fields which induce physical forces in rotor 60. The effective "rotation" of the phase energization about torque stators 70 thereby induce tangential forces in rotor 60 which causes its rotation about axis of symmetry 71. The application of approximately equal phase potentials to lower and upper torque stators 64 and 68 respectively prevent any net force being applied to rotor 60. Such applied potentials, however, do not create a levitating effect. It is to be understood that the showing of three-phase energization is merely exemplary and any other "phase rotation" energization technique is acceptable.

The motor shown in FIGS. 3 and 4 requires levitation forces in three dimensions. An axial levitation force $F_{z1}$ is required to restrain 60 in the axial directional along axis of symmetry 71. A radial levitation force $F_{r1}$, uniformly applied around circumference of rotor 60, can restrain translational motion in the plane of rotor 60. Levitational forces $F_{z1}$ and $F_{r1}$ must be large enough to overcome the force of gravity ($F_g = mg$ (weight)) which varies depending upon the orientation of rotor 60 with respect to gravity's direction. Such levitating forces are achieved by the energization of levitating stators 62 and 66 through application of the high frequency levitating voltage $V_1$ that exhibits a frequency that is in excess of the natural resonant frequencies of the levitating stator circuits.

Figure 5:
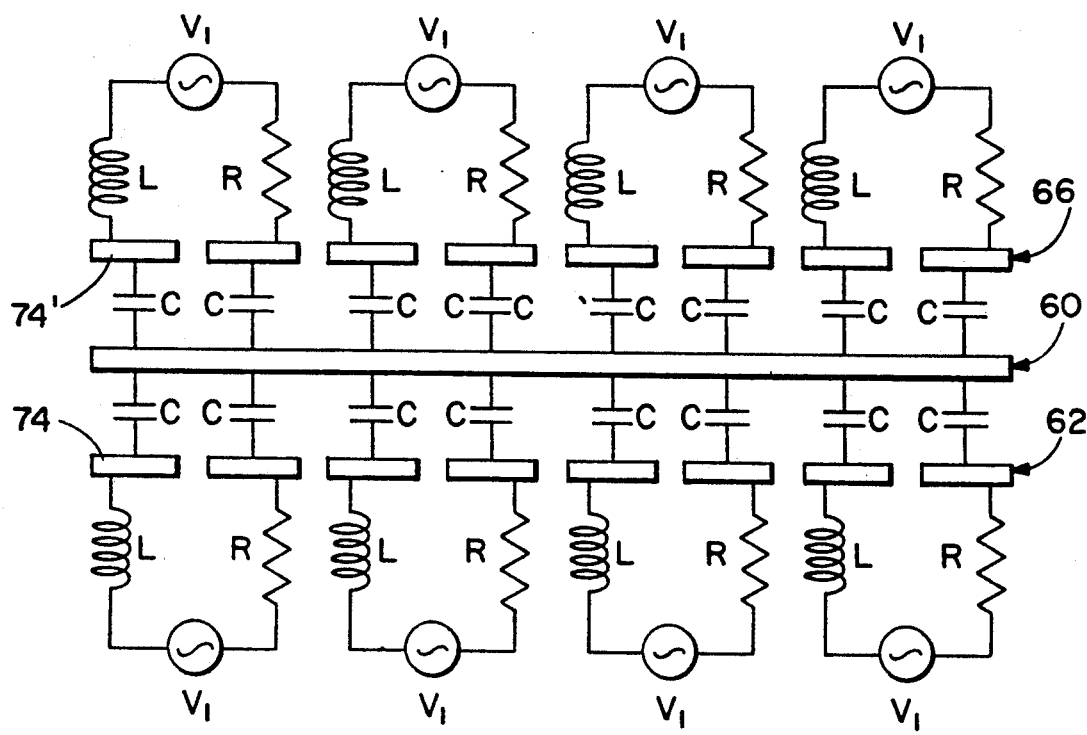
FIG. 5 is a circuit diagram showing circuitry connected to the levitating stators.

In FIG. 5, the levitating circuits are shown along with their interconnections to electrodes 74 and 74' of lower and upper levitating stators 62 and 66 respectively. Each levitating voltage $V_1$ has one side connected through an inductor L to one electrode of a levitating stator and the other side connected to an adjacent levitating stator electrode. Resistance R is the effective resistance of the circuit and does not constitute an independent resistive element. The effective capacitances C between electrodes 74, 74' and rotor 60 are shown in FIG. 5 and, together with inductor L and resistance R, form a resonant circuit having a natural resonant frequency. As indicated in the aforedescribed U.S. Pat. No. 5,015,906, so long as the operating frequency of $V_1$ is chosen to be greater than the natural frequency of the resonant circuits connected thereto, a levitation action is created between electrodes 74 and 74' and rotor 60. In essence, the electrical force fields set up between electrodes 74' and rotor 60 balance the electrical force fields set up between electrodes 74 and rotor 60 so as to create counter-balancing forces that maintain rotor 60 in a balanced, levitated position.

As is shown in FIG. 5, identical levitating voltages are applied between adjacent electrodes around the periphery of levitating stators 62 and 66. When the motor is constructed in a semiconductor structure, such voltage sources, inductors, and circuit interconnections are implemented on the planar surface of the same semiconductor substrate in which the motor structure is produced. The precise frequencies of sources $V_1$ are not required to be identical, so precise frequency control is unnecessary. In general, the frequencies of sources $V_1$ all must exceed the natural resonance frequency of their attached resonant circuits.

As with the structure described in the '906 patent, any perturbation in the vertical direction from an equilibrium condition, will cause the composite capacitances to change. For example, if rotor 60 is displaced upwardly, thereby decreasing the gap distance between itself and upper levitating stator 66, a net restoring force will be produced in the direction opposite to the displacement. This occurs because the frequency of sources $V_1$ are such that the rate of change of the voltage between electrodes 74' and rotor 60 more than compensates for the rate of change of the gap distance and results in a net levitation of rotor 60. As can be seen from the above, the levitating action on rotor 60 is separated from torque forces exerted thereupon. Thus, independent adjustments of the levitating and torque forces can be achieved without creating interdependent effects. Furthermore, the operation of the torque stators can be altered, i.e. as to frequency, voltage level, etc., without altering the levitating effects of levitating stators 62 and 66. Conversely, the potentials supplied to levitating stators 62 and 66 may be maintained at a constant level thereby achieving a highly stable levitation of rotor 60, while it is acted by torque stators 64 and 68. Lastly, there is no requirement to switch (or commutate) the high frequency levitating voltage $V_1$.

One application of the structure shown in FIGS. 3-5 is a light chopper wherein a laser beam is focused on a surface of rotor 60 through an opening in torque stator annulus 68.

Figure 6:
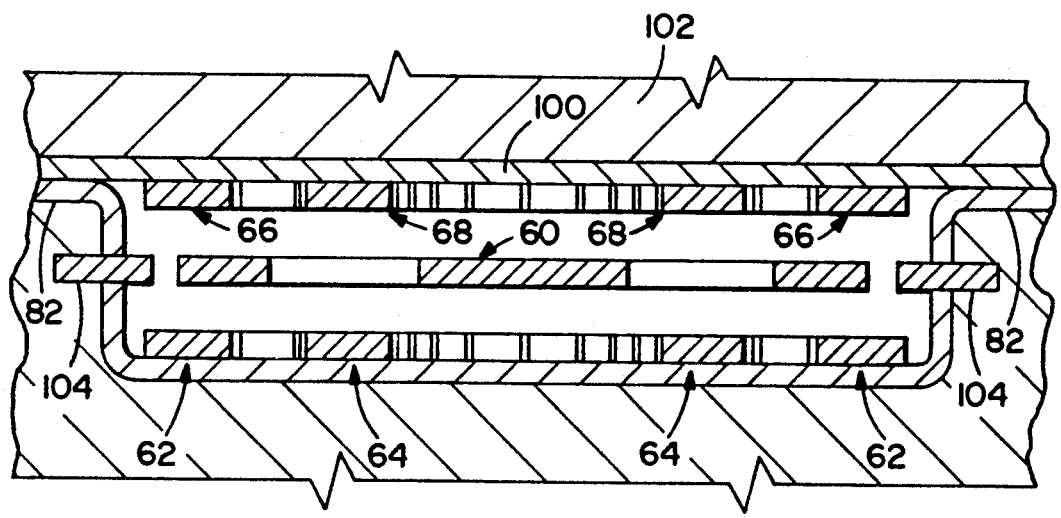
FIG. 6 is a side sectional view of another embodiment of the micromotor shown in FIGS. 3 and 4.

In FIG. 6, a non-cantilevered arrangement is shown wherein upper levitating and torque stators 66 and 68 have been photolithographically produced on an insulating layer 100 which is in turn supported by semiconductive substrate 102. By turning substrate 102 over and anodically bonding layers 82 and 100 together, a composite non-cantilevered motor structure is achieved. In this instance, the sensing of the position of rotor 60 can be achieved by conductive inserts 104. Such a system could be used as an accelerometer wherein the effective capacities between inserts 104 and rotor 60 would change upon the acceleration of the structure, such change being detected by a differential sensing arrangement well known to those skilled in the art.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. An electrostatically levitated micromotor comprising:

generally planar rotor means having an axis of symmetry and including electrically conductive portions;

torque stator means positioned adjacent said rotor means;

multiphase circuitry connected to said torque stator means for enabling rotation of said rotor means about said axis of symmetry;

levitating stator means electrically isolated from said torque stator means, including a plurality of electrode means positioned about said rotor means; and circuit means connected to pairs of said electrode means for providing circuits that include said conductive portions of said rotor means, and exhibit natural resonant frequencies, said circuit means including power source means that energize each said circuit means at a frequency greater than a natural resonant frequency of each said circuit means and electrode means, whereby forces are exerted between said levitating stator means and said rotor means that stably levitate said rotor means.

2. The electrostatically levitated micromotor recited in claim 1, wherein said torque stator means comprises a first plurality of electrodes arranged in an annulus about said axis of symmetry and adjacent a first surface of said rotor means.

3. The electrostatically levitated micromotor recited in claim 2, wherein said plurality of levitating electrodes are arranged in an annulus about said axis of symmetry, said annulus positioned adjacent said first surface of said rotor means and disposed at a periphery of said rotor means.

4. The electrostatically levitated micromotor recited in claim 3, wherein said torque stator means further comprises a second plurality of electrodes arranged in an annulus about said axis of symmetry and adjacent a second surface of said rotor means, and said plurality of levitating electrodes further comprise a second plurality of electrodes positioned adjacent said second surface of said rotor means, said torque stator electrodes and levitating stator electrodes positionally aligned about said axis of symmetry.

5. The electrostatically levitated micromotor recited in claim 4, wherein said rotor is comprised of electrically conductive material.

6. The electrostatically levitated micromotor recited in claim 5 further:
   an insulating substrate having a recess exhibiting a rim, said first plurality of levitating electrodes and said first plurality of torque stator electrodes residing in said recess, said second plurality of levitating electrodes supported at said rim and said second plurality of torque stator electrodes cantilevered from said rim so as to be disposed adjacent said second surface of said rotor.

7. The electrostatically levitated micromotor recited in claim 5, further comprising an insulating substrate having a recess exhibiting a rim, said first plurality of levitating electrodes and said first plurality of torque stator electrodes residing in said recess, said second plurality of levitating electrodes and said second plurality of torque stator electrodes positioned on a second insulating substrate, said first and second insulating substrates bonded together so as to comprise a unitary structure, whereby said torque stator electrodes and levitating stator electrodes are positionally opposed to each other in an aligned manner, said rotor means being positioned therebetween.

8. The electrostatically levitated micromotor recited in claim 4, wherein said circuit means comprises a source of energizing voltage connected between pairs of levitating electrodes, and including an inductor positioned in said circuit so as to create a resonant circuit when taken in combination with capacitances existing between said levitating electrodes and said rotor means.

9. The electrostatically levitated micromotor recited in claim 8, wherein said rotor means comprises a circular rotor provided with apertures arranged in an annulus about said rotor, which annulus is aligned with said torque stator annulus.

* * * * *